J. A. KAISERLIK.
HOG GAMBREL.
APPLICATION FILED JUNE 22, 1907.
957,344.
Patented May 10, 1910.
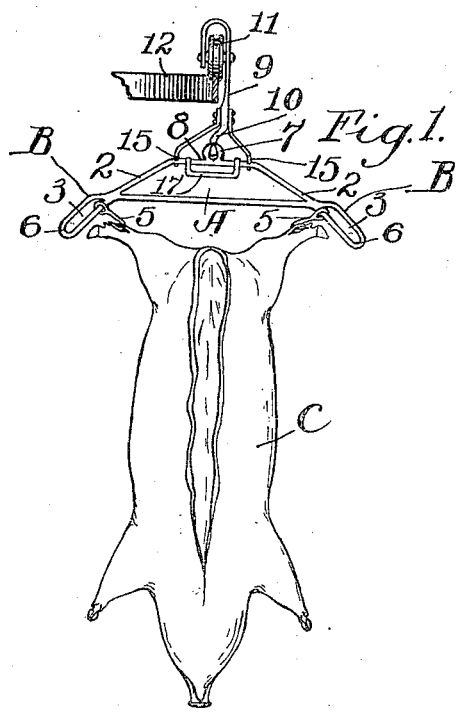
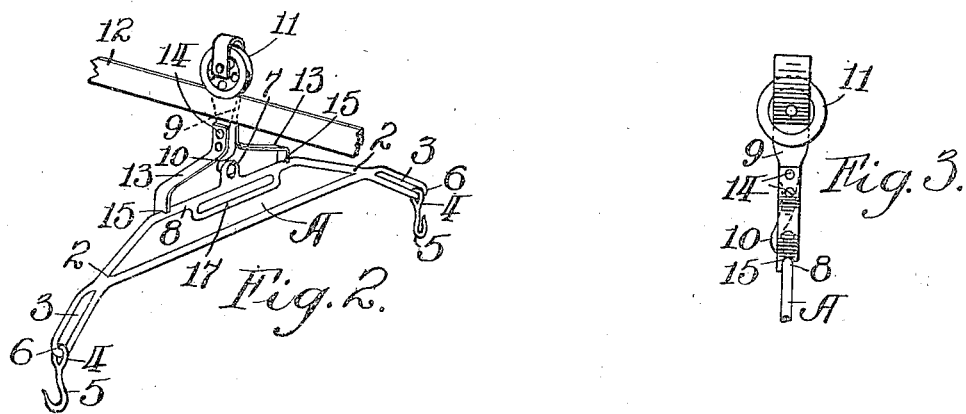
Witnesses:
J. W. Dahlgren.
H. L. Fischer.
Inventor:
John A. Kaiserlik,
by F. G. Bradbury
Attorney.

UNITED STATES PATENT OFFICE.

JOHN A. KAISERLIK, OF STEWARTVILLE, MINNESOTA.

HOG-GAMBREL.

957,344. Specification of Letters Patent. Patented May 10, 1910.

Application filed June 22, 1907. Serial No. 380,266.

*To all whom it may concern:*

Be it known that I, JOHN A. KAISERLIK, a citizen of the United States, residing at Stewartville, in the county of Olmsted and State of Minnesota, have invented a new and useful Improvement in Hog-Gambrels, of which the following is a specification.

My invention relates to improvements in hog gambrels and more particularly relates to that class of apparatus used for suspending hogs or other animals after they have been killed for facilitating butchering, dressing and weighing. Heretofore it has been customary to hoist the carcass by its hind legs so that it can be readily cut, halved and the meat dressed. This invention employs this method of suspension and enables the carcass to be more easily cut by the cleaver by spreading the segregated parts without hand manipulation.

In the accompanying drawings forming part of this specification, Figure 1 is a side view of my invention showing the device upon a carrier and a hog supported thereby; Fig. 2 is a perspective view of my invention, and Fig. 3 is a detail end view partly in section.

In the drawings A represents a suitable frame having two lateral arms 2, the ends of which are provided with downwardly and outwardly inclined spreaders B having openings or elongated eyelets 3 in which the shanks 4 of hooks 5 are freely engaged by loops 6. The frame between its ends is provided with an upper loop 7 on a substantially horizontal bar 8. The frame is suspended from a carrier 9 of ordinary constuction having a hook 10 which with the loop 7 forms a separable coupling support for the frame. The carrier 9 is provided with a grooved antifriction wheel 11 which travels upon a track 12 so that the carcass such as C can be moved from place to place while it is suspended from the gambrel.

In use the points of the hooks 5 are passed through the hind legs of the hog in the customary manner, the loops of said hooks seating themselves in the upper ends of the spreaders. As the cleaver cuts down through the hog the segregated parts are separated by the tendency of the hooks to spread and seat themselves in the lower ends of the spreaders. In this manner the halves of the hog are separated so that a clean cut can be made by the cleaver.

The shank of the hook 10 on the carrier is provided with a pair of lock bars 13, the upper ends of which are secured to said shank by rivets 14 and their lower ends notched at 15 to lock into engagement with the horizontal bar 8 on the crane. The lock bars 13 hold the crane in substantially horizontal position. It is obvious that these bars need not be used unless desired and that the frame can be freely suspended from the carrier.

It is obvious that this invention can be applied to beef trees and other butchers' appliances within the scope of this specification and the following claim.

In accordance with the patent statutes, I have described the principle of operation of my invention, together with the apparatus which I now consider to represent the best embodiment thereof, but I desire to have it understood that the apparatus shown is only illustrative and that the invention can be carried out by other means and applied to uses other than those above set forth, within the scope of the following claim.

Having described my invention, what I claim as new and desire to protect by Letters Patent, is:—

A device of the class set forth, comprising, a pair of integral and lateral spreader arms having loops upon their outer ends which are elongated downwardly and outwardly, hooks having free connection with said arms through said loops, an overhead carrier, a separable connection between said carrier and arms to suspend the latter and a pair of stops upon said carrier adapted to rigidly hold said arms in substantially horizontal position when coupled to said carrier.

In testimony whereof, I have signed my name to this specification, in the presence of two subscribing witnesses.

JOHN A. KAISERLIK.

Witnesses:
H. L. FISCHER,
F. G. BRADBURY.